(12) United States Patent
Chen

(10) Patent No.: US 11,131,842 B2
(45) Date of Patent: Sep. 28, 2021

(54) METHOD AND APPARATUS FOR DISPLAYING INFORMATION RING AND AUGMENTED REALITY DISPLAY FOR MICROSCOPE

(71) Applicant: TENCENT AMERICA LLC, Palo Alto, CA (US)

(72) Inventor: Hanbo Chen, Seattle, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/806,143

(22) Filed: Mar. 2, 2020

(65) Prior Publication Data

US 2021/0271068 A1    Sep. 2, 2021

(51) Int. Cl.
  *G02B 21/36*    (2006.01)
  *G06T 19/00*    (2011.01)
  *G06T 7/00*     (2017.01)

(52) U.S. Cl.
  CPC ......... *G02B 21/368* (2013.01); *G02B 21/367* (2013.01); *G06T 7/0012* (2013.01); *G06T 19/006* (2013.01); *G06T 2207/10056* (2013.01)

(58) Field of Classification Search
  CPC .. G02B 21/368; G02B 21/367; G06T 19/006; G06T 7/0012; G06T 2207/10056
  See application file for complete search history.

(56) References Cited

U.S. PATENT DOCUMENTS

| | | | | |
|---|---|---|---|---|
| 2013/0278635 | A1* | 10/2013 | Maggiore | G06F 3/0304 345/633 |
| 2015/0077528 | A1* | 3/2015 | Awdeh | A61B 3/14 348/53 |
| 2016/0357263 | A1* | 12/2016 | Antoniac | G02B 27/017 |
| 2018/0024341 | A1* | 1/2018 | Romanowski | G02B 21/365 359/385 |
| 2018/0360310 | A1* | 12/2018 | Berlin | A61B 3/13 |
| 2019/0282099 | A1* | 9/2019 | Emelis | A61B 90/37 |
| 2019/0285867 | A1* | 9/2019 | Huang | G02B 27/0179 |
| 2019/0340909 | A1* | 11/2019 | Nguyen | G08B 21/02 |
| 2020/0097727 | A1* | 3/2020 | Stumpe | G02B 21/365 |
| 2020/0135329 | A1* | 4/2020 | Huang | A61B 6/46 |

FOREIGN PATENT DOCUMENTS

| | | | |
|---|---|---|---|
| JP | 2009207755 A | * 9/2009 | |
| WO | WO-2018231204 A1 | * 12/2018 | G02B 21/361 |

OTHER PUBLICATIONS

International Search Report dated Mar. 26, 2021 from the International Searching Authority in International Application No. PCT/US2021/018500.
Written Opinion dated Mar. 26, 2021 from the International Searching Authority in International Application No. PCT/US2021/018500.

* cited by examiner

*Primary Examiner* — Richard A Hansell, Jr.
(74) *Attorney, Agent, or Firm* — Sughrue Mion, PLLC

(57) ABSTRACT

A method, device, system, and computer-readable medium for displaying an augmented reality (AR) image, including controlling a camera to capture an image of a view through a microscope; generating information corresponding to the image; generating the AR image including an information ring configured to display the information; and controlling an AR display to display the AR image such that the information ring is at least partially overlaid over a periphery of the view through the microscope while the view is visible to a user of the microscope.

21 Claims, 5 Drawing Sheets

METHOD AND APPARATUS FOR DISPLAYING INFORMATION RING AND AUGMENTED REALITY DISPLAY FOR MICROSCOPE

FIELD

The present disclosure is related to augmented reality. Specifically, the present disclosure is related to displaying an augmented-reality image corresponding to a microscope view.

BACKGROUND

Pathological imaging may be used in the diagnosis of many clinical conditions, for example diagnosis of benign or malignant tumors. However, this task is complicated and may require many years of experience to accomplish effectively. Some challenging cases may even require opinions from multiple experts in order for conclusion to be drawn. Meanwhile, a lack of experienced pathologists may limit the throughput of the task and thus delay treatment. Computer-aided diagnosis (CAD) systems have been developed to process pathological images and help doctors to speed up and improve the accuracy of diagnosis. However, most existing CAD system visualize the result on the computer monitor while doctors usually read tissue slide under microscope. As a result, the doctor may need to switch between microscope and computer monitor which slows down the process.

SUMMARY

According to an embodiment, a method of displaying an augmented reality (AR) image includes controlling a camera to capture an image of a view through a microscope; generating information corresponding to the image; generating the AR image including an information ring configured to display the information; and controlling an AR display to display the AR image such that the information ring is at least partially overlaid over a periphery of the view through the microscope while the view is visible to a user of the microscope.

According to an embodiment, a device for displaying an augmented reality (AR) image includes a camera configured to capture an image of a view through a microscope; an AR display configured to display an AR image as being at least partially overlaid over a view through a microscope while the view is visible to a user of the microscope; at least one memory configured to store program code; and at least one processor configured to read the program code and operate as instructed by the program code, the program code including: first generating code configured to cause the at least one processor to generate information corresponding to the image; second generating code configured to cause the at least one processor to generate the AR image including an information ring configured to display the information; and displaying code configured to cause the at least one processor to control the AR display to display the AR image such that the information ring is at least partially overlaid over a periphery of the view through the microscope.

According to an embodiment, a non-transitory computer-readable medium stores one or more instructions that, when executed by one or more processors of a device for displaying an augmented reality (AR) image, cause the one or more processors to: control a camera to capture an image of a view through a microscope; generate information corresponding to the image; generate the AR image including an information ring configured to display the information; and control an AR display to display the AR image such that the information ring is at least partially overlaid over a periphery of the view through the microscope while the view is visible to a user of the microscope.

DETAILED DESCRIPTION

Embodiments provide an information ring to display information such as computer feedbacks to a user of a microscope. Embodiments may add an augmented reality (AR) device to the microscope and visualize the result on top of the scene of tissue under microscope. Embodiments may take enlarged tissue images such as a microscopy image (MSI) as input, and then automatically process the image to identify lesion or abnormal tissues such as cancer cells on the image. The computation result may be displayed under microscope with AR device in format of information ring. The information ring can help deliver information to the user without impacting readers reading images under microscope.

AR visualization may overlay or overlap computer generated graphics on top of the scene under microscope. Though this eliminates the need of switching between computer and microscopy, it could result in blockage of the microscope view, or a change the appearance of tissue with the graphics shown. This could disrupt users or even cause an incorrect diagnosis. In embodiments, an information ring may solve this problem by showing content surrounding the scene under microscope.

Also, given the limited space under the view of microscope, the information that can be displayed is limited. Information ring may be designed like the task bar on computer, which can clearly and simultaneously show multiple pieces of different information.

Figure 1:
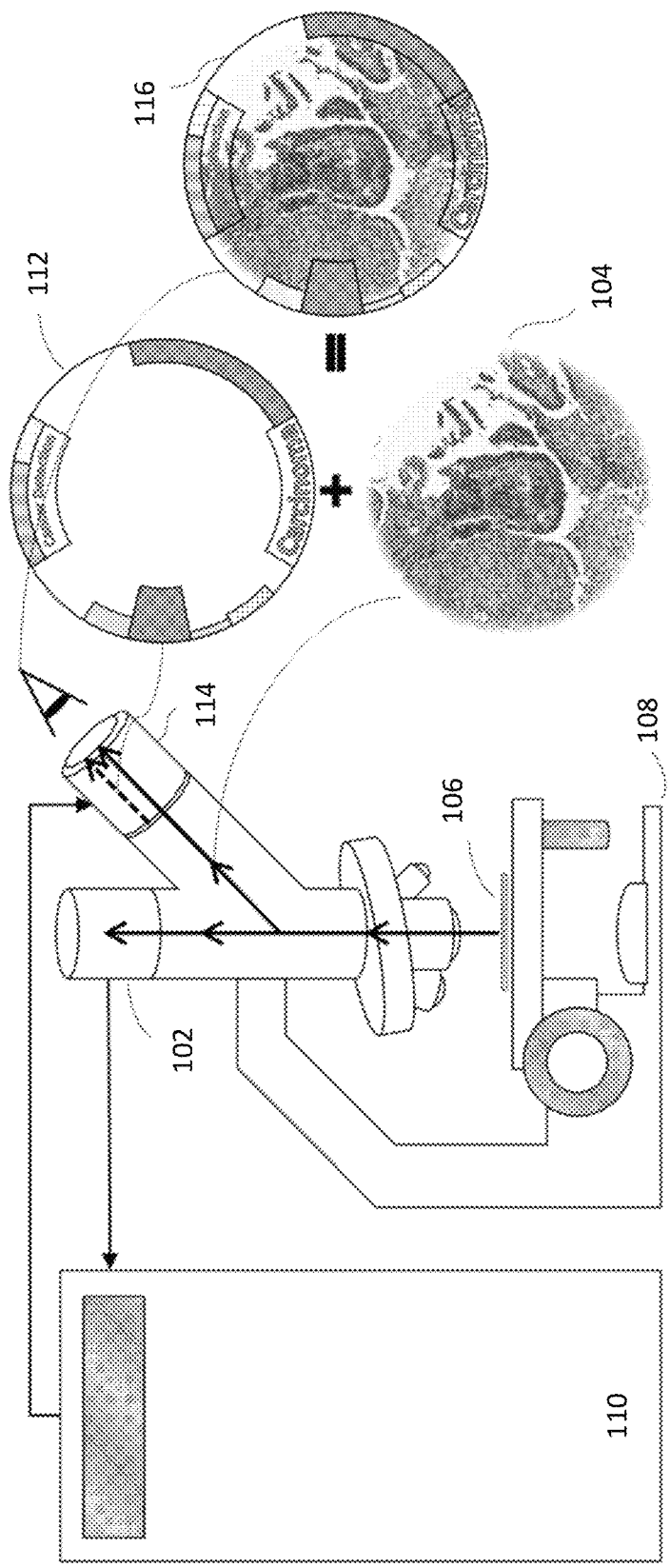
FIG. 1 is a diagram of an overview of an example implementation of an augmented-reality microscope system, according to an embodiment.

FIG. 1 is an illustration of an embodiment of an AR microscope system 100. According to embodiments, AR microscope system 100 may include an image sensor, for example a camera 102, which may capture a microscope image 104 of a tissue slide 106 under microscope 108. A computer 110 will compute and generate the information ring 112 based on the captured microscope image 104. An AR device 114 will combine the light signal of tissue slide 106 observed under microscope 108 with information ring 112. A user may observe slide 106 using microscope 108 together with the information ring 112 as AR overlaid view 116. In this way, a large amount of information may be presented through microscope 108. In AR overlaid view 116, information ring 112 may be overlaid on top of the view captured in microscope image 104.

In embodiments, AR microscope system 100 may include microscope 108, which may be used to zoom and inspect tissue slide 106. Microscope 108 can send a signal to computer 110 to tell computer 110 which objective lens is currently in use when the objective lens is switched, or the computer 110 send a request signal for the information.

In embodiments, AR microscope system 100 may include an image sensor such as camera 102. Camera 102 may be installed on the lens tube of microscope 108 to capture the view under microscope 108 as microscope image 104.

In embodiments, AR microscope system 100 may include an AR device 114, which may be for example an AR lens installed on the ocular microscope 108 to overlay the an AR image such as information ring 112 on top of the view of slide 106. In embodiments, information ring 112 may be overlaid over microscope image 104, or may be overlaid on another view or representation of the view of slide 106 provided by microscope 108

In embodiments, AR microscope system 100 may include Computer 110, which may provide image computation and data storage In embodiments, AR microscope system 100 may include information ring 112, which may include a circular graphic image surrounding the view provided by microscope 108. Various pieces of information may be displayed as a part of information ring 112, including but not limited to text, circular bars, circular histograms, icons, and colors. In embodiments, information ring 112 may be circular, or may be any other shape such as square, rectangular, trapezoidal, triangular, or any other shape or portion of such shape.

Figure 2:
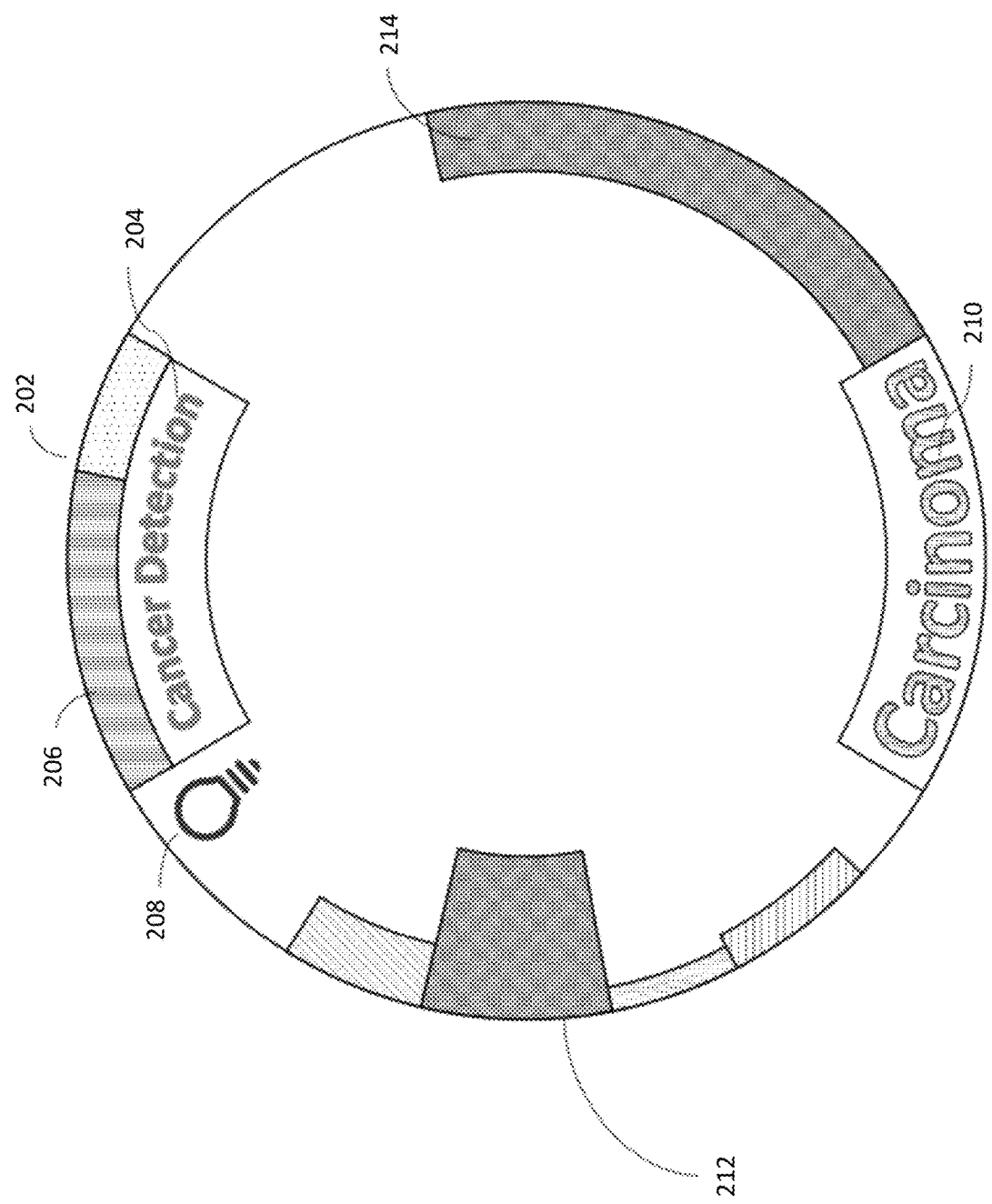
FIG. 2 is a diagram of an information ring of an augmented-reality microscope system, according to an embodiment.

An example of information ring 112 is illustrated in FIG. 2, according to embodiments. As shown in FIG. 2, the information included in information ring 112 may be shown on a ring surrounding the scene captured in microscope image 104. In this way, the user's view may not be blocked. Also, information may be presented in simple form, which a user can read with peripheral vision. In this way, efficiency of information delivery may be increased while reducing the impact on user's activity.

FIG. 2 illustrates an exemplary embodiment in which information ring 112 provides information relating to tissue.

System menu 202 is shown on top of information ring 112. System message 204 may inform users of a current status and menu options corresponding to AR microscope system 100. For example, in FIG. 2. system message 204 shows "Cancer Detection" which may indicate that the AR microscope system 100 is currently running a cancer detection module and is now detecting potential cancer cells on tissue slide 106. Illustrated near system menu 204 is progress bar 206, which may show information such as computation progress, system speed, task finished, etc. Illustrated beside the system menu 202 is an icon 208, which may reflect a system status. For example, in embodiments a red bubble may mean that the view through microscope 108 is too dark, a green bubble may mean that the view through microscope 108 is too bright, a triangle may indicate a loss of focus, and a square may indicate that tissue slide 106 is not properly loaded on microscope 108.

In embodiments, to facilitate reading, texts are only shown on the top of information ring 112 (for example as system message 204) and the bottom of the information ring 210 (for example as result message 210). Result message 210 may indicate a current running result. For example, when carcinoma tissue is detected, a red "Carcinoma" may be displayed as result message 210 to alert a user. As another example, if the AR microscope system 100 is still processing, a blue "Running" may be displayed as result message 210. If the message is too long to display, the message can be displayed in a sliding or scrolling manner.

In embodiments, a histogram such as circular histogram 212 may be placed on the side of the view through microscope 108. Circular histogram 212 may show statistics information, for example a percentage of each type of tissue inside the view. Different color can be used to represent different type of tissue.

In embodiments, a bar such as circular bar 214 may show quantitative information, such as an analysis confidence level, for example a confidence level of classifying tissue as carcinoma.

In embodiments, AR microscope system 100 may save the user from the trouble of switching between microscope 108 and computer monitor of computer 110. AR microscope system 100 may show information under microscope 108 without impacting users view of the tissue slide 106. AR microscope system 100 may deliver rich information of the AR microscope system 100 and the a computation or analysis result of AR microscope system 100. AR microscope system 100 may alert users for potential risks and thus reduce the chance of error.

Examples of AR microscope system 100 shown in various figures and described above may present information ring 112 in a ring shape because which may correspond to a circular shape of the view through microscope 108. However, in embodiments microscope 108 shows a view having a different shape, and information ring 112 may be in a corresponding shape which may display information in the periphery of a user's sight. In addition, information ring 112 can be used in any other type of AR system as desired, for example AR glasses and AR goggles.

Figure 3:
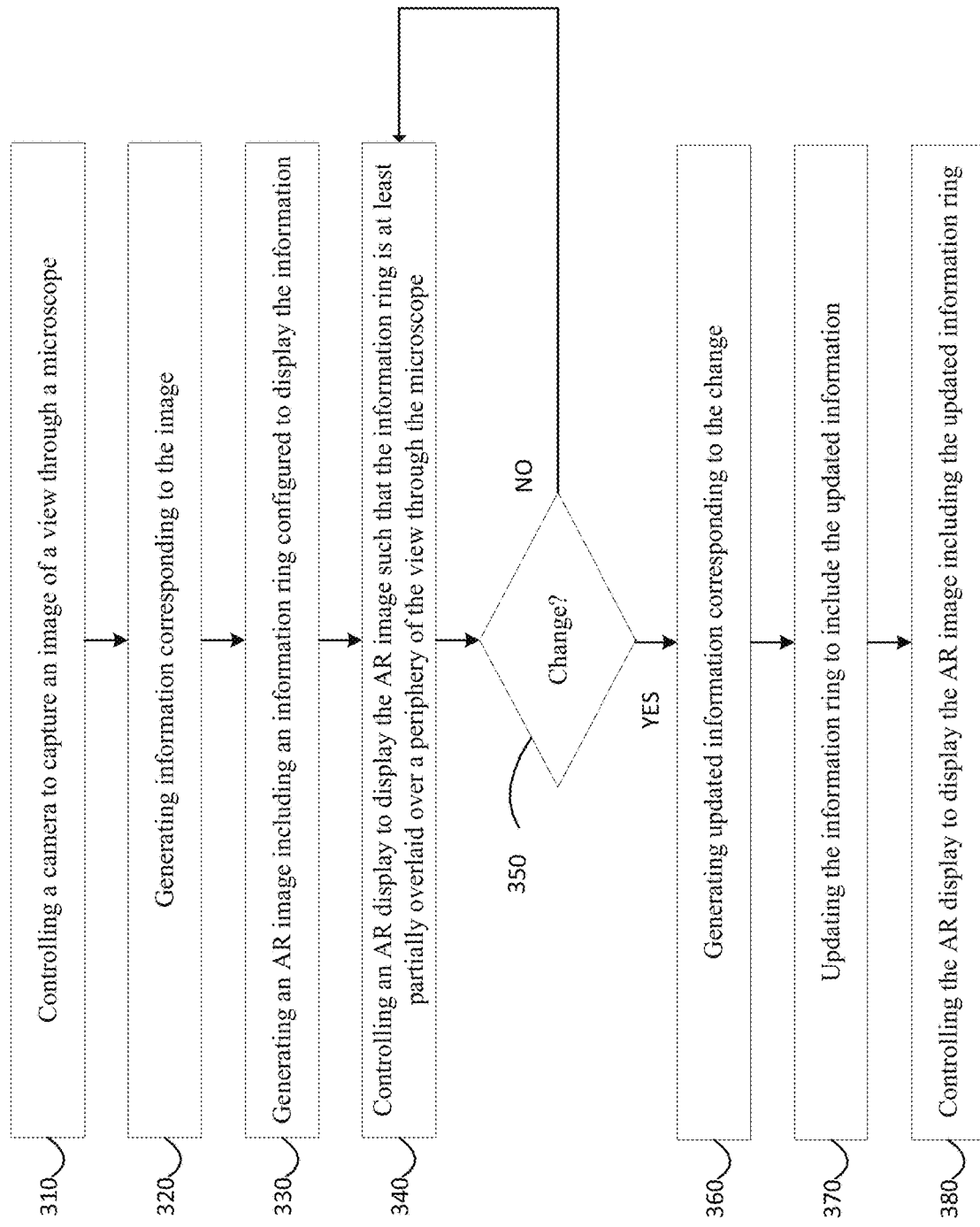
FIG. 3 is a flow chart of an example process for displaying an augmented-reality image including an information ring, according to an embodiment.

FIG. 3 is a flow chart of an example process 300 for displaying an augmented reality (AR) image. In some implementations, one or more process blocks of FIG. 3 may be performed by computer 108 or platform 420, described below. In some implementations, one or more process blocks of FIG. 3 may be performed by another device or a group of devices separate from or including computer 110 or platform 420, such as microscope 108, camera 102, AR device 114, or user device 410 described below.

As shown in FIG. 3, process 300 may include controlling a camera to capture an image of a view through a microscope (block 310).

As further shown in FIG. 3, process 300 may include generating information corresponding to the image (block 320).

As further shown in FIG. 3, process 300 may include generating the AR image including an information ring configured to display the information (block 330).

As further shown in FIG. 3, process 300 may include controlling an AR display to display the AR image such that the information ring is at least partially overlaid over a periphery of the view through the microscope while the view is visible to a user of the microscope (block 340).

As further shown in FIG. 3, process 300 may include determining whether a change, for example a change in the image or a change in the information included in the information ring has occurred (block 350).

As further shown in FIG. 3, if there is no change (block 350—NO), then process 300 may return to block 340.

As further shown in FIG. 3, if motion is detected (block 350—YES), then process 300 may include generating updated information corresponding to the change (block 360).

As further shown in FIG. 3, process 300 may include updating the information ring to include the updated information (block 370).

As further shown in FIG. 3, process 300 may include controlling the AR display to display the AR image including the updated information ring (block 380).

According to an embodiment, the information may include at least one from among information about a subject included in the view through the microscope, information about a diagnosis of the subject, information about an analysis of the subject, information about a status of the analysis, information about a computation corresponding to the microscope, and information about a status of the computation.

According to an embodiment, the AR image may be displayed such that the information ring is only displayed within a predetermined distance of a circumference of the view through the microscope.

According to an embodiment, the information may be represented within the AR image as at least one of a text, a bar, a histogram, and an icon.

According to an embodiment, the text may include a system message corresponding to a system associated with the microscope, and a result message indicating a result of an analysis of the image.

According to an embodiment, the process 300 may further include scrolling the text in a text display area of the information ring.

According to an embodiment, the bar may include a progress bar indicating a progress of at least one of an analysis of a subject included in the image, and a computation corresponding to the microscope.

According to an embodiment, the bar may include a circular bar indicating quantitative information corresponding to a subject included in the view through the microscope.

According to an embodiment, the quantitative information may include a confidence level of an analysis of the subject.

According to an embodiment, the icon may indicate a status of a system associated with the microscope.

According to an embodiment, the histogram may represent at least one statistic corresponding to the image. According to an embodiment process 300 may further include storing an image comprising the view through the microscope at least partially overlaid with the adjusted AR image.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
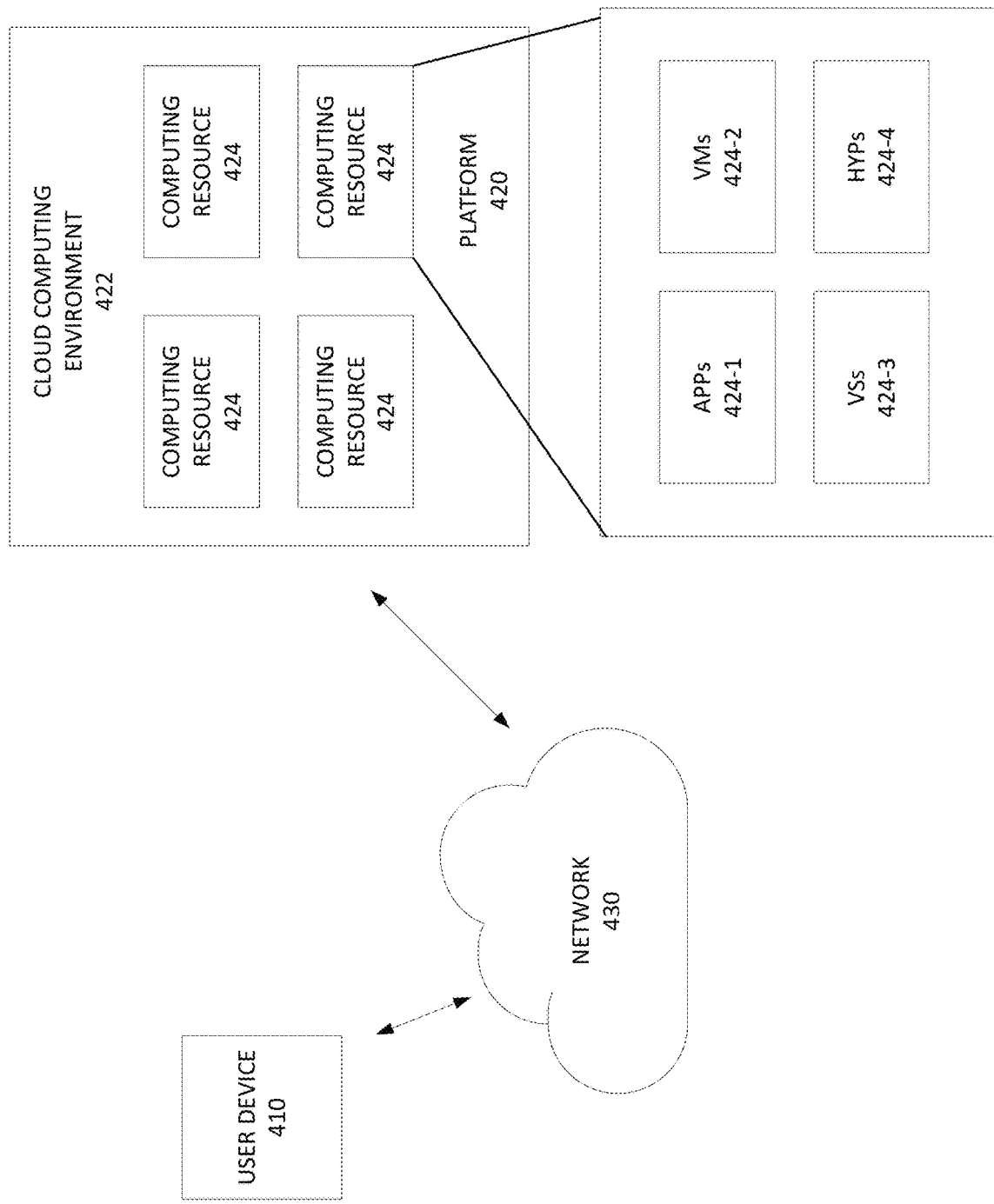
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user device 410, a platform 420, and a network 430. For example, user device 410 may correspond to various components such as microscope 108, camera 102, and AR device 114. In addition, platform 420 may correspond to computer 108. Devices of environment 400 may interconnect via wired connections, wireless connections, or a combination of wired and wireless connections.

User device 410 includes one or more devices capable of receiving, generating, storing, processing, and/or providing information associated with platform 420. For example, user device 410 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 410 may receive information from and/or transmit information to platform 420.

Platform 420 includes one or more devices capable of generating an AR image to be displayed as overlaid onto a view through a microscope, as described elsewhere herein. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 is not be cloud-based (i.e., may be implemented outside of a cloud computing environment) or may be partially cloud-based.

Cloud computing environment 422 includes an environment that hosts platform 420. Cloud computing environment 422 may provide computation, software, data access, storage, etc. services that do not require end-user (e.g., user device 410) knowledge of a physical location and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

Application 424-1 includes one or more software applications that may be provided to or accessed by user device 410. Application 424-1 may eliminate a need to install and execute the software applications on user device 410. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS").

A process virtual machine may execute a single program, and may support a single process. In some implementations, virtual machine 424-2 may execute on behalf of a user (e.g., user device 410), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 200 may perform one or more functions described as being performed by another set of devices of environment 200.

Figure 5:
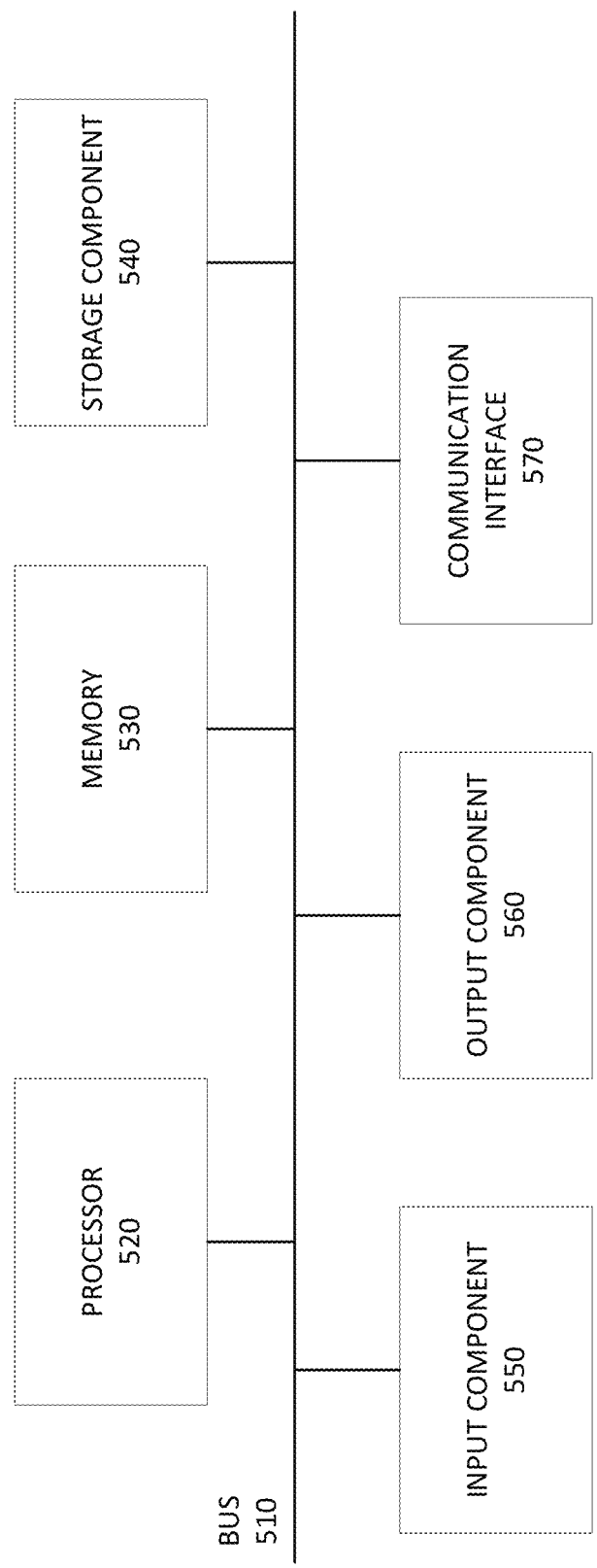
FIG. 5 is a diagram of example components of one or more devices of FIG. 4.

FIG. 5 is a diagram of example components of a device 300. Device 300 may correspond to user device 410 and/or platform 420. As shown in FIG. 5, device 300 may include a bus 510, a processor 520, a memory 330, a storage component 540, an input component 550, an output component 560, and a communication interface 570.

Bus 510 includes a component that permits communication among the components of device 300. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 300. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 300 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 300 (e.g., a display, a speaker, and/or one or more light-emitting diodes (LEDs)).

Communication interface 570 includes a transceiver-like component (e.g., a transceiver and/or a separate receiver and transmitter) that enables device 300 to communicate with other devices, such as via a wired connection, a wireless connection, or a combination of wired and wireless connections. Communication interface 570 may permit device 300 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 520 executing software instructions stored by a non-transitory computer-readable medium, such as memory 330 and/or storage component 540. A computer-readable medium is defined herein as a non-transitory memory device. A memory device includes memory space within a single physical storage device or memory space spread across multiple physical storage devices.

Software instructions may be read into memory 330 and/or storage component 540 from another computer-readable medium or from another device via communication interface 570. When executed, software instructions stored in memory 330 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 300 may include additional components, fewer components, different components, or differently arranged components than those shown in FIG. 5. Additionally, or alternatively, a set of components (e.g., one or more components) of device 300 may perform one or more functions described as being performed by another set of components of device 300.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of displaying an augmented reality (AR) image, the method comprising:
   controlling a camera to capture an image of a view through a microscope;
   generating information corresponding to the image, including quantitative information corresponding to a subject included in the view through the microscope;
   generating the AR image including an information ring configured to display the information; and
   controlling an AR display to display the AR image such that the information ring is at least partially overlaid over a periphery of the view through the microscope while the view is visible to a user of the microscope,
   wherein the information ring includes a histogram indicating the quantitative information,
   wherein the histogram includes a plurality of bars extending around a partial circumference of the view through the microscope, and extending a plurality of distances from the partial circumference toward a center of the view through the microscope.

2. The method of claim 1, wherein the information includes at least one from among information about the subject included in the view through the microscope, information about a diagnosis of the subject, information about an analysis of the subject, information about a status of the analysis, information about a computation corresponding to the microscope, and information about a status of the computation.

3. The method of claim 1, wherein the AR image is displayed such that the information ring is only displayed within a predetermined distance of a circumference of the view through the microscope.

4. The method of claim 1, wherein the information is represented within the AR image as at least one of a text, a circular bar, and an icon.

5. The method of claim 4, wherein the text includes a system message corresponding to a system associated with the microscope, and a result message indicating a result of an analysis of the image.

6. The method of claim 5, further comprising scrolling the text in a text display area of the information ring.

7. The method of claim 1, wherein the information ring includes a progress bar indicating a progress of at least one of an analysis of the subject included in the image, and a computation corresponding to the microscope.

8. The method of claim 1, wherein the quantitative information includes a confidence level of an analysis of the subject.

9. The method of claim 4, wherein the icon indicates a status of a system associated with the microscope.

10. The method of claim 4, wherein the histogram represents at least one statistic corresponding to the image.

11. The method of claim 1, further comprising:
    detecting a change in the image;
    generating updated information corresponding to the changed image;
    updating the information ring to include the updated information;
    controlling the AR display to display the AR image including the updated information ring.

12. A device for displaying an augmented reality (AR) image, the device comprising:
    a camera configured to capture an image of a view through a microscope;
    an AR display configured to display an AR image as being at least partially overlaid over the view through the microscope while the view is visible to a user of the microscope;
    at least one memory configured to store program code; and
    at least one processor configured to read the program code and operate as instructed by the program code, the program code including:
      first generating code configured to cause the at least one processor to generate information corresponding to the image, including quantitative information corresponding to a subject included in the view through the microscope;
      second generating code configured to cause the at least one processor to generate the AR image including an information ring configured to display the information; and
      displaying code configured to cause the at least one processor to control the AR display to display the AR image such that the information ring is at least partially overlaid over a periphery of the view through the microscope, wherein the information ring includes a histogram indicating the quantitative information, and wherein the histogram includes a plurality of bars extending around a partial circumference of the view through the microscope, and extending a plurality of distances from the partial circumference toward a center of the view through the microscope.

13. The device of claim 12, wherein the information includes at least one from among information about the subject included in the view through the microscope, information about a diagnosis of the subject, information about an analysis of the subject, information about a status of the analysis, information about a computation corresponding to the microscope, and information about a status of the computation.

14. The device of claim 12, wherein the AR image is displayed such that the information ring is only displayed within a predetermined distance of a circumference of the view through the microscope.

15. The device of claim 12, wherein the information is represented within the AR image as at least one of a text, a circular bar, and an icon.

16. The device of claim 12, wherein the program code further includes:
   detecting code configured to cause the at least one processor to detect a change in the image;
   third generating code configured to cause the at least one processor to generate updated information corresponding to the changed image;
   updating code configured to cause the at least one processor to update the information ring to include the updated information;
   second displaying code configured to cause the at least one processor to control the AR display to display the AR image including the updated information ring.

17. A non-transitory computer-readable medium storing one or more instructions that, when executed by one or more processors of a device for displaying an augmented reality (AR) image, cause the one or more processors to:
   control a camera to capture an image of a view through a microscope;
   generate information corresponding to the image, including quantitative information corresponding to a subject included in the view through the microscope;
   generate the AR image including an information ring configured to display the information; and
   control an AR display to display the AR image such that the information ring is at least partially overlaid over a periphery of the view through the microscope while the view is visible to a user of the microscope,
   wherein the information ring includes a histogram indicating the quantitative information, and
   wherein the histogram includes a plurality of bars extending around a partial circumference of the view through the microscope, and extending a plurality of distances from the partial circumference toward a center of the view through the microscope.

18. The non-transitory computer-readable medium of claim 17, wherein the information includes at least one from among information about the subject included in the view through the microscope, information about a diagnosis of the subject, information about an analysis of the subject, information about a status of the analysis, information about a computation corresponding to the microscope, and information about a status of the computation.

19. The non-transitory computer-readable medium of claim 17, wherein the AR is image is displayed such that the information ring is only displayed within a predetermined distance of a circumference of the view through the microscope.

20. The method of claim 1, wherein the histogram includes a first bar extending around a first partial circumference of the view through the microscope, and extending a first distance from the first partial circumference toward the center of the view through the microscope,
   wherein the histogram includes a second bar extending around a second partial circumference of the view through the microscope, and extending a second distance from the second partial circumference toward the center of the view through the microscope,
   wherein a size of the first partial circumference is equal to a size of the second partial circumference, and
   wherein the first distance is different from the second distance.

21. The method of claim 1, wherein the histogram shows a plurality of percentages representing an amount of a plurality of tissues visible in the view.

* * * * *